US012769980B2

(12) United States Patent
Metzen

(10) Patent No.: US 12,769,980 B2
(45) Date of Patent: Oct. 20, 2026

(54) METHOD FOR ASCERTAINING AN OPTIMAL ARCHITECTURE OF AN ARTIFICIAL NEURAL NETWORK

(71) Applicant: Robert Bosch GmbH, Stuttgart (DE)

(72) Inventor: Jan Hendrik Metzen, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 637 days.

(21) Appl. No.: 18/348,148

(22) Filed: Jul. 6, 2023

(65) Prior Publication Data

US 2024/0013026 A1 Jan. 11, 2024

(30) Foreign Application Priority Data

Jul. 11, 2022 (DE) ..................... 10 2022 207 072.0

(51) Int. Cl.
*G06N 3/04* (2023.01)
*G06N 3/092* (2023.01)

(52) U.S. Cl.
CPC ............... *G06N 3/04* (2013.01); *G06N 3/092* (2023.01)

(58) Field of Classification Search
CPC ............ G06N 3/04; G06N 3/092; G06N 3/09; G06N 3/0985; G06N 3/082; G06N 3/02; G06N 20/00
See application file for complete search history.

(56) References Cited

U.S. PATENT DOCUMENTS

2022/0188605 A1* 6/2022 Laszlo ................. G06N 3/0442
2023/0142885 A1* 5/2023 Laszlo ................... G06N 3/006 706/15
2023/0196541 A1* 6/2023 Laszlo ................... G06N 3/061 382/141

FOREIGN PATENT DOCUMENTS

| | | | |
|---|---|---|---|
| DE | 102019214625 | A1 | 3/2021 |
| EP | 3629246 | A1 | 4/2020 |
| WO | 2020190745 | A1 | 9/2020 |

OTHER PUBLICATIONS

Chatzianastasis, et al.: "Graph-based Neural Architecture Search with Operation Embeddings," Proceedings of IEEE/CVF International Conference on Computer Vision Workshops, (2021), pp. 393-402; URL: https://openaccess.thecvf.com/contenVICCV2021W/NeurArch/htm1/Chatzia nastasis GraphBased_Neural_Architecture_Search_With_Operation_Embeddings_ICCVW_2021_paper.html.
(Continued)

*Primary Examiner* — Khoi V Le
(74) *Attorney, Agent, or Firm* — Norton Rose Fulbright US LLP

(57) ABSTRACT

A method for ascertaining an optimal architecture of an artificial neural network. The method includes: ascertaining the optimal architecture of the artificial neural network by repeatedly ascertaining a trajectory from the initial node to a terminal node based on the defined strategy, determining a reward for the ascertained trajectory, determining a cost function for the ascertained trajectory based on the ascertained reward for the trajectory and the flows associated with the edges along the trajectory, and respectively updating the flows associated with the edges along the trajectory, based on the cost function until an ascertained trajectory fulfills a termination criterion for the architecture search, wherein the trajectory that fulfills the termination criterion represents the optimal architecture.

10 Claims, 2 Drawing Sheets

(56) References Cited

OTHER PUBLICATIONS

Ying, et al.: "NAS-Bench-101: Towards Reproducible Neural Architecture Search," Proceedings of the 36th International Conference on Machine Learning, (2019), Long Beach, California. pp. 1-10; URL: http://proceedings.mlr.press/v97/ying19a.

Zhong, et al.: "Practical Block-wise Neural Network Architecture Generation," Proceedings of IEEE/CVF Conference on Computer Vision and Pattern Recognition, (2018), pp. 2423-2432. URL: https:/ /openaccess. thecvf .com/content_cvpr_ 2018/html/Zhong_ Practical_ BlockWise_ Neural_ CVP R 2018 pa per.html.

* cited by examiner

METHOD FOR ASCERTAINING AN OPTIMAL ARCHITECTURE OF AN ARTIFICIAL NEURAL NETWORK

CROSS REFERENCE

The present application claims the benefit under 35 U.S.C. § 119 of German Patent Application No. DE 10 2022 207 072.0 filed on Jul. 11, 2022, which is expressly incorporated herein by reference in its entirety.

FIELD

The present invention relates to a method for ascertaining an optimal architecture of an artificial neural network with which resources in ascertaining the optimal architecture can be saved and with which the accuracy in ascertaining the optimal architecture can also be increased at the same time.

BACKGROUND INFORMATION

Machine learning algorithms are based on statistical methods being used to train a data processing system in such a way that it can perform a particular task without it having originally been programmed explicitly for this purpose. The goal of machine learning is to construct algorithms that can learn and make predictions from data. These algorithms create mathematical models with which data can be classified, for example.

One example of such machine learning algorithms are artificial neural networks. Such artificial neural networks are oriented toward biological neurons and allow an unknown system behavior to be learned from existing training data and to subsequently apply the learned system behavior even to unknown input variables. The neural network consists of layers with idealized neurons, which are interconnected in different ways according to a topology of the network. The first layer, also referred to as the input layer, senses and transmits the input values, wherein the number of neurons in the input layer corresponds to the number of input signals that are to be processed. The last layer is also referred to as the output layer and has as many neurons as output values are to be provided. In addition, at least one intermediate layer is located between the input layer and the output layer and is often also referred to as the hidden layer, wherein the number of intermediate layers and the number and/or type of neurons in these layers depends on the specific task to be achieved by the neural network.

However, the development of the architecture of the artificial neural network, i.e., the determination of the appearance of the network or of the number of layers in the network as well as the determination of the number and/or type of neurons in the individual layers, is usually very complex, in particular with regard to resource consumption. In order to optimize the development of the architecture, the neural architecture search (NAS) was developed, which develops optimal architectures for specific problems in an automated manner. The NAS algorithm first assembles an architecture for the artificial neural network from various modules and configurations, which architecture is subsequently trained with a set of training data, and wherein obtained results are subsequently evaluated with regard to performance. Based on this assessment, a new architecture that is expected to be more optimal with regard to performance can subsequently be ascertained, which architecture is subsequently again trained based on the training data, and wherein the obtained results are subsequently again evaluated with regard to performance. These steps may be repeated as many times as necessary until changes in the architecture no longer achieve improvement, wherein gradient-based methods are usually used to ascertain the more optimal architecture.

In particular, the performance of an artificial neural network depends on the architecture selected, among other things. However, it proves disadvantageous that it is usually difficult to determine an actually optimal architecture for the artificial neural network, wherein the determination of the optimal architecture is nevertheless usually associated with high resource consumption.

A method for creating an artificial neural network is described in German Patent Application No. DE 10 2019 214 625 A1. The method comprises providing a plurality of different data sets, initializing a plurality of hyperparameters, training the artificial neural network, evaluating the trained artificial neural network, optimizing the hyperparameters depending on the evaluation, and retraining the artificial neural network using the optimized hyperparameters.

SUMMARY

The present invention is thus based on the task of specifying an improved method for ascertaining an optimal architecture for an artificial neural network.

The task may be achieved by a method for ascertaining an optimal architecture of an artificial neural network according to the features of the present invention.

The object is moreover also achieved by a system for ascertaining an optimal architecture of an artificial neural network according to the features of the present invention.

According to one example embodiment of the present invention, this object may be achieved by a method for ascertaining an optimal architecture of an artificial neural network, wherein the method comprises providing a set of possible architectures of the artificial neural network; representing the set of possible architectures of the artificial neural network in a directed graph, wherein the nodes of the directed graph respectively symbolize a subset of one of the possible architectures, wherein an initial node symbolizes an input layer, wherein terminal nodes of the directed graph respectively symbolize a subset comprising an output layer, and wherein the edges of the directed graph symbolize possible links between the subsets; associating, for each edge of the directed graph, a flow with the corresponding edge; defining a strategy for ascertaining an optimal architecture based on the directed graph; and ascertaining the optimal architecture of the artificial neural network by repeatedly ascertaining a trajectory from the initial node to a terminal node based on the defined strategy, determining a reward for the ascertained trajectory, determining a cost function for the ascertained trajectory based on the ascertained reward for the trajectory and the flows associated with the edges along the trajectory, and respectively updating the flows associated with the edges along the trajectory, based on the cost function, wherein the steps of ascertaining a trajectory, of determining a reward, of determining a cost function, and of updating the flows are repeated until an ascertained trajectory fulfills a termination criterion for the architecture search, and wherein the trajectory that fulfills the termination criterion represents the optimal architecture.

A set of possible architectures is understood to mean a plurality of possible architectures of the artificial neural network or a corresponding search space.

A directed graph is also a graph comprising nodes and edges connecting individual nodes, wherein the edges are directed edges, i.e., edges that can only be passed through in one direction.

Each node of the directed graph symbolizing a subset of one of the possible architectures means that each node symbolizes a subset of at least one of the possible architectures of the artificial neural network, wherein each node may symbolize a different subset, and wherein the subsets may be distributed among the individual nodes of the directed graph such that, overall, all possible architectures of the artificial neural network are included or represented in the directed graph. The subsets respectively comprise or denote at least one layer of the corresponding possible architecture.

A strategy for ascertaining an optimal architecture based on the directed graph is furthermore understood to mean a plan or a specification based on which individual nodes of the directed graph are selected in order to obtain the trajectory.

In particular, a continuous path between the initial node and one of the terminal nodes is referred to as a trajectory.

A reward is furthermore understood to mean a merit, determinable by evaluating the architecture representing the corresponding trajectory, of an improvement achievable by the corresponding architecture.

Furthermore, a cost function or loss is understood to mean a loss or error between a reward, expected based on the flows associated with the edges along the trajectory, for the ascertained trajectory and the determined actual reward for the trajectory.

A termination criterion for the architecture search is moreover specified as a predefined criterion, wherein the ascertainment of the optimal architecture is terminated if an ascertained architecture or an architecture represented by an ascertained trajectory fulfills the termination criterion.

The architecture being represented by the ascertained trajectory means that the architecture is formed by correspondingly linking the subsets symbolized by the nodes along the ascertained trajectory.

The method according to the present invention thus differs from conventional methods for ascertaining an optimal architecture of an artificial neural network in that not the reward itself is optimized, but potential architectures are respectively checked or examined based on the rewards associated with these architectures. In addition, the method according to the present invention differs from conventional methods for ascertaining an optimal architecture of an artificial neural network in that gradients for determining a more optimal architecture are not estimated, for example, but flows or merits associated with the individual edges of the directed graph or associations between subsets of the possible architectures of the artificial neural network are optimized and adapted to the actual circumstances.

The advantage of not optimizing the reward itself but of checking or examining potential architectures based on the rewards associated with these architectures is that the accuracy in ascertaining the optimal architecture and in particular also the probability of finding the actually optimal architecture can be increased.

In addition, the advantage of not estimating gradients but of optimizing flows or merits associated with the individual edges of the directed graph or associations between subsets of the possible architectures of the artificial neural network and adapting them to the actual circumstances is that this is, for example, less susceptible to noise and overall requires fewer iterations to ascertain the optimal architecture, whereby resources required to ascertain the optimal architecture, such as memory and/or processor capacities, can be saved.

Overall, an improved method for ascertaining an optimal architecture for an artificial neural network may thus be provided.

In this case, the strategy for ascertaining an optimal architecture based on the directed graph can be defined in such a way that it specifies, for each node of the directed graph, a probability of the trajectory to be ascertained passing through the corresponding node of the directed graph, wherein the probability is in each case proportional to the flow associated with an edge of the directed graph leading to the corresponding node, and wherein the trajectory is ascertained by respectively selecting the edge with the highest probability and/or proportionally to the probability.

The probability being proportional to the flow associated with an edge of the directed graph leading to the corresponding node means that the probability is the greater, the greater the flow associated with the edge of the directed graph leading to the corresponding node is.

Respectively selecting the edge with the highest probability furthermore means that the trajectory is ascertained in that the edge, starting or proceeding from a node along the trajectory, with the highest probability value or the highest associated flow is respectively selected as part of the trajectory.

Alternatively, for example, the edge may be selected proportionally to the probability.

Thus, the strategy may reflect or be based on a probability distribution so that the ascertainment of the optimal architecture, and in particular the adaptation of the flows, can take place in a simple manner by functions used in connection with artificial neural networks, without the need for complex and resource-intensive adaptations.

The strategy specifying, for each node of the directed graph, a probability of the trajectory to be ascertained passing through the corresponding node of the directed graph, wherein the probability is in each case proportional to the flow associated with an edge of the directed graph leading to the corresponding node, and wherein the trajectory is ascertained by respectively selecting the edge with the highest probability, is however only a preferred embodiment. For example, the strategy may additionally also specify that it is also possible at particular times to deviate from the specified probabilities and to follow other edges, as a result of which the method may converge more quickly, in particular if the initial association of the flows with the edges has taken place randomly.

In one example embodiment of the present invention, the reward for the trajectory is determined based on hardware conditions of at least one target component.

A target component is understood to mean a server or client on which a correspondingly trained artificial neural network is subsequently used.

Hardware conditions of the at least one target component are furthermore understood to mean items of information about the resources available, in particular for the use of the artificial neural network, of the at least one target component, e.g., memory and/or processor capacities.

Conditions of the data processing system on which the correspondingly trained artificial neural network is subsequently used are thus taken into account in ascertaining the optimal architecture of the artificial neural network.

With a further example embodiment of the present invention, a method for training an artificial neural network is also specified, wherein the method comprises providing training data for training the artificial neural network; providing an optimal architecture for the artificial neural network, wherein the optimal architecture has been ascertained by a method described above for ascertaining an optimal architecture of an artificial neural network; and training the artificial neural network based on the training data and the optimal architecture.

A method for training an artificial neural network is thus specified, which method is based on an optimal architecture ascertained by an improved method for ascertaining an optimal architecture for an artificial neural network. An advantage of not optimizing the reward itself but of checking or examining potential architectures based on the rewards associated with these architectures is that the accuracy in ascertaining the optimal architecture and in particular also the probability of finding the actually optimal architecture can be increased. In addition, the advantage of not estimating gradients but of optimizing flows or merits associated with the individual edges of the directed graph or associations between subsets of the possible architectures of the artificial neural network and adapting them to the actual circumstances is that this is, for example, less susceptible to noise and overall requires fewer iterations to ascertain the optimal architecture, whereby resources required to ascertain the optimal architecture, such as memory and/or processor capacities, can be saved.

The training data may comprise sensor data.

A sensor, which is also referred to as a detector, (measurement or measuring) sensor or (measuring) transmitter, is a technical part that can qualitatively detect particular physical or chemical properties and/or the material characteristics of its surroundings or detect them quantitatively as a measured variable.

Circumstances outside of the actual data processing system on which the method is performed can thus be captured in a simple manner and taken into account in the training of the artificial neural network.

With a further example embodiment of the present invention, a method for controlling a controllable system based on an artificial neural network is furthermore also specified, wherein the method comprises providing an artificial neural network, which is trained to control the controllable system, wherein the artificial neural network has been trained by a method described above for training an artificial neural network; and controlling the controllable system based on the provided artificial neural network.

The controllable system may, in particular, be a robotic system, wherein the robotic system may, for example, be an embedded system of a motor vehicle and/or a motor vehicle function.

According to an example embodiment of the present invention, a method for controlling a controllable system based on an artificial neural network is thus specified, wherein the artificial neural network is based on an optimal architecture ascertained by an improved method for ascertaining an optimal architecture for an artificial neural network. The advantage of not optimizing the reward itself but of checking or examining potential architectures based on the rewards associated with these architectures is that the accuracy in ascertaining the optimal architecture and in particular also the probability of finding the actually optimal architecture can be increased. In addition, the advantage of not estimating gradients but of optimizing flows or merits associated with the individual edges of the directed graph or associations between subsets of the possible architectures of the artificial neural network and adapting them to the actual circumstances is that this is, for example, less susceptible to noise and overall requires fewer iterations to ascertain the optimal architecture, whereby resources required to ascertain the optimal architecture, such as memory and/or processor capacities, can be saved.

With a further example embodiment of the present invention, a system for ascertaining an optimal architecture of an artificial neural network is moreover also specified, wherein the system comprises a provision unit designed to provide a set of possible architectures of the artificial neural network; a mapping unit designed to map the set of possible architectures of the artificial neural network onto a directed graph, wherein the nodes of the directed graph respectively symbolize a subset of one of the possible architectures, wherein an initial node symbolizes an input layer, wherein terminal nodes of the directed graph respectively symbolize a subset comprising an output layer, and wherein the edges of the directed graph respectively symbolize possible links between the subsets; an association unit designed to associate, for each edge of the directed graph, a respective flow with the corresponding edge; a definition unit designed to define a strategy for ascertaining an optimal architecture based on the directed graph; and an ascertainment unit designed to ascertain the optimal architecture of the artificial neural network by repeatedly ascertaining a trajectory from the initial node to a terminal node based on the defined strategy, determining a reward for the ascertained trajectory, determining a cost function for the ascertained trajectory based on the ascertained reward for the trajectory and the flows associated with the edges along the trajectory, and respectively updating the flows associated with the edges along the trajectory, based on the cost function, wherein the steps of ascertaining a trajectory, of determining a reward, of determining a cost function, and of updating the flows are repeated until an ascertained trajectory fulfills a termination criterion for the architecture search, and wherein the trajectory that fulfills the termination criterion represents the optimal architecture.

An improved system for ascertaining an optimal architecture for an artificial neural network is thus specified. The advantage of not optimizing the reward itself but of checking or examining potential architectures based on the rewards associated with these architectures is that the accuracy in ascertaining the optimal architecture and in particular also the probability of finding the actually optimal architecture can be increased. In addition, the advantage of not estimating gradients but of optimizing flows or merits associated with the individual edges of the directed graph or associations between subsets of the possible architectures of the artificial neural network and adapting them to the actual circumstances is that this is, for example, less susceptible to noise and overall requires fewer iterations to ascertain the optimal architecture, whereby resources required to ascertain the optimal architecture, such as memory and/or processor capacities, can be saved.

In this case, the strategy for ascertaining an optimal architecture based on the directed graph can specify, for each node of the directed graph, a probability of the trajectory to be ascertained passing through the corresponding node of the directed graph, wherein the probability is in each case proportional to the flow associated with an edge of the directed graph leading to the corresponding node, and wherein the ascertainment unit is designed to ascertain the trajectory by respectively selecting the edge with the highest probability. Thus, the strategy may reflect or be based on a probability distribution so that the ascertainment of the optimal architecture, and in particular the adaptation of the flows, can take place in a simple manner by functions using in connection with artificial neural networks, without the need for complex and resource-intensive adaptations.

The strategy specifying, for each node of the directed graph, a probability of the trajectory to be ascertained passing through the corresponding node of the directed graph, wherein the probability is in each case proportional to the flow associated with an edge of the directed graph leading to the corresponding node, and wherein the ascertainment unit is designed to ascertain the trajectory by respectively selecting the edge with the highest probability, is however only a preferred embodiment. For example, the strategy may additionally also specify that it is also possible at particular times to deviate from the specified probabilities and to follow other edges, as a result of which the method may converge more quickly, in particular if the initial association of the flows with the edges has taken place randomly.

In one example embodiment of the present invention, the ascertainment unit is moreover designed to determine the reward for the trajectory based on hardware conditions of at least one target component. Conditions of the data processing system on which the correspondingly trained artificial neural network is subsequently used are thus taken into account in ascertaining the optimal architecture of the artificial neural network.

With a further example embodiment of the present invention, a system for training an artificial neural network is moreover also specified, wherein the system comprises a first provision unit designed to provide training data for training the artificial neural network; a second provision unit designed to provide an optimal architecture for the artificial neural network, wherein the optimal architecture has been ascertained by a system described above for ascertaining an optimal architecture for an artificial neural network; and a training unit designed to train the artificial neural network based on the training data and the optimal architecture.

A system for training an artificial neural network is thus specified, which system is based on an optimal architecture ascertained by an improved system for ascertaining an optimal architecture for an artificial neural network. The advantage of not optimizing the reward itself but of checking or examining potential architectures based on the rewards associated with these architectures is that the accuracy in ascertaining the optimal architecture and in particular also the probability of finding the actually optimal architecture can be increased. In addition, the advantage of not estimating gradients but of optimizing flows or merits associated with the individual edges of the directed graph or associations between subsets of the possible architectures of the artificial neural network and adapting them to the actual circumstances is that this is, for example, less susceptible to noise and overall requires fewer iterations to ascertain the optimal architecture, whereby resources required to ascertain the optimal architecture, such as memory and/or processor capacities, can be saved.

The training data may again comprise sensor data. Circumstances outside of the actual data processing system on which the method is performed can thus be captured in a simple manner and taken into account in the training of the artificial neural network.

With a further example embodiment of the present invention, a system for controlling a controllable system based on an artificial neural network is moreover also specified, wherein the system comprises a provision unit designed to provide an artificial neural network, which is trained to control the controllable system, wherein the artificial neural network has been trained by a system described above for training an artificial neural network; and a control unit designed to control the controllable system based on the provided artificial neural network.

A system for controlling a controllable system based on an artificial neural network is thus specified, wherein the artificial neural network is based on an optimal architecture ascertained by an improved system for ascertaining an optimal architecture for an artificial neural network. The advantage of not optimizing the reward itself but of checking or examining potential architectures based on the rewards associated with these architectures is that the accuracy in ascertaining the optimal architecture and in particular also the probability of finding the actually optimal architecture can be increased. In addition, the advantage of not estimating gradients but of optimizing flows or merits associated with the individual edges of the directed graph or associations between subsets of the possible architectures of the artificial neural network and adapting them to the actual circumstances is that this is, for example, less susceptible to noise and overall requires fewer iterations to ascertain the optimal architecture, whereby resources required to ascertain the optimal architecture, such as memory and/or processor capacities, can be saved.

With a further example embodiment of the present invention, a computer program with program code is furthermore also specified for performing a method described above for ascertaining an optimal architecture of an artificial neural network when the computer program is executed on a computer.

With a further example embodiment of the present invention, a computer-readable data carrier with program code of a computer program is moreover also specified for performing a method described above for ascertaining an optimal architecture of an artificial neural network when the computer program is executed on a computer.

The computer program and the computer-readable data carrier each may have the advantage of being designed to perform an improved method for ascertaining an optimal architecture for an artificial neural network. The advantage of not optimizing the reward itself but of checking or examining potential architectures based on the rewards associated with these architectures is that the accuracy in ascertaining the optimal architecture and in particular also the probability of finding the actually optimal architecture can be increased. In addition, the advantage of not estimating gradients but of optimizing flows or merits associated with the individual edges of the directed graph or associations between subsets of the possible architectures of the artificial neural network and adapting them to the actual circumstances is that this is, for example, less susceptible to noise and overall requires fewer iterations to ascertain the optimal architecture, whereby resources required to ascertain the optimal architecture, such as memory and/or processor capacities, can be saved.

In summary, it should be noted that the present invention specifies a method for ascertaining an optimal architecture of an artificial neural network with which resources in ascertaining the optimal architecture can be saved and with which the accuracy in ascertaining the optimal architecture can also be increased at the same time.

The described embodiments and developments of the present invention can be combined with one another as desired.

Further possible embodiments, developments and implementations of the present invention also include not explicitly mentioned combinations of features of the present invention described above or below with respect to exemplary embodiments.

BRIEF DESCRIPTION OF THE DRAWINGS

The figures are intended to provide a better understanding of the embodiments of the present invention. They illustrate embodiments and, in connection with the description, serve to explain principles and concepts of the present invention.

Other embodiments and many of the mentioned advantages become apparent from the figures. The illustrated elements of the figures are not necessarily shown to scale with respect to one another.

In the figures, identical reference signs denote identical or functionally identical elements, parts or components, unless stated otherwise.

DETAILED DESCRIPTION OF EXAMPLE EMBODIMENTS

Figure 1:
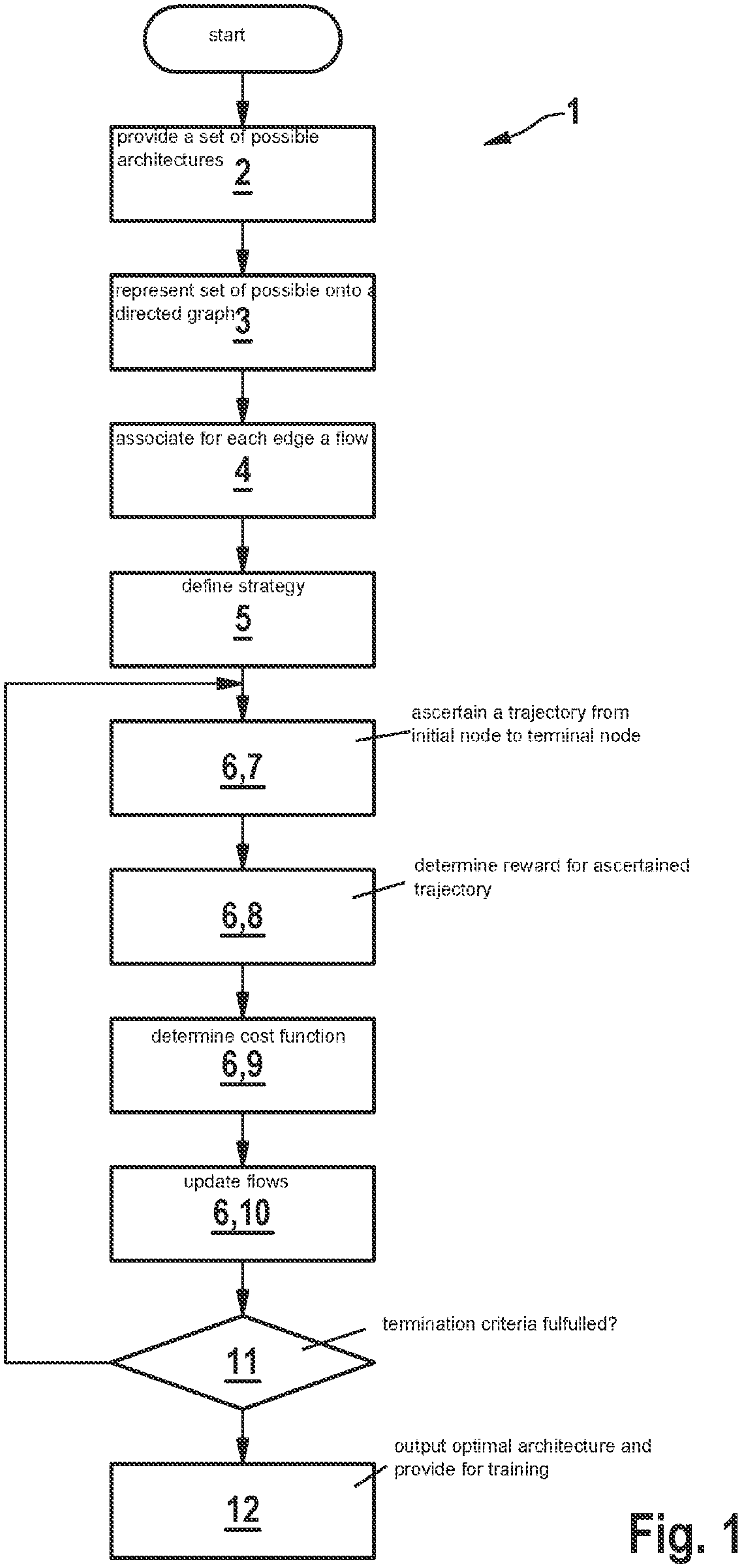
FIG. 1 shows a flow chart of a method for ascertaining an optimal architecture of an artificial neural network according to example embodiments of the present invention.

FIG. 1 shows a flow chart of a method for ascertaining an optimal architecture of an artificial neural network 1 according to example embodiments of the present invention.

A neural architecture search (NAS) is generally understood to mean a method for the automated development of an optimal architecture of artificial neural networks for a specified problem. This eliminates the elaborate, manual design of artificial neural networks and is a subarea of automated machine learning.

Scalable neural architecture search methods are gradient-based methods. In this case, a supergraph is formed from all possible architectures, contained in a search space, for the artificial neural network, wherein the individual possible architectures are subgraphs of the supergraph. The nodes of the supergraph respectively symbolize a subset of one of the possible architectures, wherein a node can respectively, in particular, symbolize exactly one possible layer of the artificial neural network, wherein an initial node symbolizes an input layer of the artificial neural network, wherein terminal nodes of the directed graph respectively symbolize a subset of one of the possible architectures, which comprises an output layer, and wherein the edges symbolize possible links between the subsets, wherein each edge is respectively associated with a parameter based on a strategy for selecting nodes. Furthermore, attempts are made to use the supergraph as the basis for finding an architecture for which a reward or yield is maximum, wherein a gradient descent method is used to determine the optimal architecture for the artificial neural network.

FIG. 1 shows a method 1, which comprises a step 2 of providing a set of possible architectures of the artificial neural network, or of a corresponding search space; a step 3 of representing the set of possible architectures of the artificial neural network in a directed graph, wherein the nodes of the directed graph respectively symbolize a subset of one of the possible architectures, wherein an initial node symbolizes an input layer, wherein terminal nodes of the directed graph respectively symbolize a subset comprising an output layer, and wherein the edges of the directed graph symbolize possible links between the subsets; a step 4 of associating, for each edge of the directed graph, a flow with the corresponding edge; a step 5 of defining a strategy for ascertaining an optimal architecture based on the directed graph; and a step 6 of ascertaining the optimal architecture of the artificial neural network by repeatedly ascertaining a trajectory from the initial node to a terminal node based on the defined strategy 7, determining a reward for the20scertainned trajectory 8, determining a cost function for the ascertained trajectory based on the ascertained reward for the trajectory and the flows associated with the edges along the trajectory 9, and respectively updating the flows associated with the edges along the trajectory, based on the cost function wherein it is checked in a step 11 whether a thus ascertained trajectory fulfills a termination criterion for the architecture search, wherein the steps of ascertaining a trajectory 7, of determining a reward 8, of determining a cost function 9, and of updating the flows are repeated until an ascertained trajectory fulfills a termination criterion if the thus ascertained trajectory does not fulfill the termination criterion, and wherein, if it is ascertained in step 11 that the thus ascertained trajectory fulfills the termination criterion, the trajectory that fulfills the termination criterion represents the optimal architecture, wherein the optimal architecture is output and provided for training the artificial neural network in a step 12.

The advantage of not optimizing the reward itself but of checking or examining potential architectures based on the rewards associated with these architectures is that the accuracy in ascertaining the optimal architecture and in particular also the probability of finding the actually optimal architecture can be increased.

In addition, the advantage of not estimating gradients but of optimizing flows or merits associated with the individual edges of the directed graph or associations between subsets of the possible architectures of the artificial neural network and adapting them to the actual circumstances is that this is, for example, less susceptible to noise and overall requires fewer iterations to ascertain the optimal architecture, whereby resources required to ascertain the optimal architecture, such as memory and/or processor capacities, can be saved.

Overall, an improved method for ascertaining an optimal architecture for an artificial neural network 1 is thus specified.

In particular, FIG. 1 shows a method 1 which is based on the application of flow methods instead of a gradient-based approach.

The set of possible architectures and thus also the directed graph or supergraph may be based on labeled training data, e.g., labeled sensor data for training the artificial neural network.

According to the embodiments of FIG. 1, each node in the directed graph furthermore symbolizes exactly one possible layer of the artificial neural network. Based on the method 1 shown, the architecture may in particular be constructed sequentially, i.e., each layer may be selected individually, or it may in each case be ascertained individually which layer is to be inserted at what time. For this purpose, the links of the directed graph may in particular be specified on a specified set of actions that relate to the selection of individual edges of the directed graph.

Step 8 of determining a reward for the ascertained trajectory may furthermore again take place, for example, in that the architecture represented by the ascertained trajectory is trained based on the labeled training data, wherein the obtained results are subsequently validated or evaluated with regard to performance.

The cost function in step 9 may, for example, also be determined by determining a flow matching objective. However, the cost function may furthermore also be determined, for example, by determining a detailed balance objective and backward policy or a trajectory balance objective.

Step 10 of respectively updating the flows associated with the edges along the trajectory, based on the cost function may furthermore comprise applying a backtracking algorithm.

The termination criterion may also be selected in such a way that the method 1 continues with step 11 as soon as a reward ascertained for an ascertained trajectory is within a specified target range for the reward.

The initial flow values may furthermore be selected randomly.

Furthermore, the strategy for ascertaining an optimal architecture based on the directed graph may be based on the flow values.

According to the embodiments of FIG. 1, the strategy for ascertaining an optimal architecture based on the directed graph in particular specifies, for each node of the directed graph, a probability of the trajectory to be ascertained passing through the corresponding node of the directed graph, wherein the probability is in each case proportional to the flow associated with an edge of the directed graph leading from a previously selected node to the corresponding node, and wherein the trajectory is ascertained by respectively selecting the edge with the highest probability and/or proportionally to the probability.

The strategy moreover specifies that it is additionally also possible at particular times to deviate from the specified probabilities and to follow other edges.

According to the embodiments of FIG. 1, the reward for the trajectory is furthermore also determined based on hardware conditions of at least one target component. For example, the hardware requirements may respectively also be included in the determination of the performance of an artificial neural network trained based on the architecture representing the trajectory and on training data, wherein the hardware properties may be provided with a weighting factor, and wherein the focus is on the hardware requirements the more, the greater this weighting factor is selected.

An optimal architecture23scertainned by the method 1 may subsequently be used to train a corresponding artificial neural network based on corresponding labeled training data.

In particular, an artificial neural network may be trained to control a controllable system and be subsequently used to control the controllable system, wherein the controllable system may, for example, be an embedded system of a motor vehicle or functions of an autonomously driving motor vehicle.

However, an artificial neural network may furthermore also be trained to classify image data, in particular digital image data, on the basis of low-level features, e.g., edges or pixel attributes. In this case, an image processing algorithm can furthermore be used to analyze a classification result which is focused on corresponding low-level features.

Figure 2:
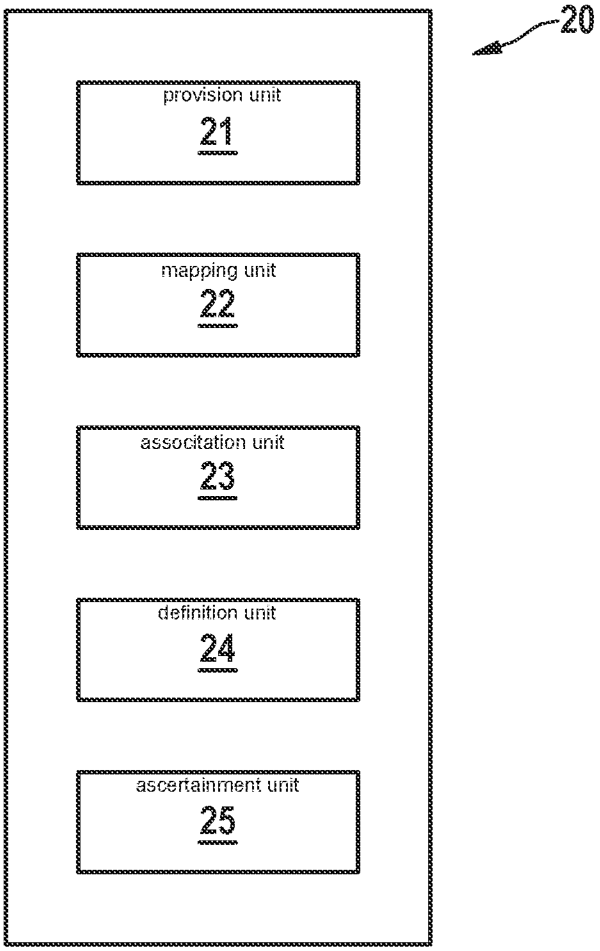
FIG. 2 shows a schematic block diagram of a system for ascertaining an optimal architecture of an artificial neural network according to embodiments of the present invention.

FIG. 2 shows a schematic block diagram of a system for ascertaining an optimal architecture of an artificial neural network 20 according to embodiments of the present invention.

According to the embodiments of FIG. 2, the system 20 comprises a provision unit 21 designed to provide a set of possible architectures of the artificial neural network; a mapping unit 22 designed to map the set of possible architectures of the artificial neural network onto a directed graph, wherein the nodes of the directed graph respectively symbolize a subset of one of the possible architectures, wherein an initial node symbolizes an input layer, wherein terminal nodes of the directed graph respectively symbolize a subset comprising an output layer, and wherein the edges of the directed graph symbolize possible links between the subsets; an association unit 23 designed to associate, for each edge of the directed graph, a respective flow with the corresponding edge; a definition unit 24 designed to define a strategy for ascertaining an optimal architecture based on the directed graph; and an ascertainment unit 25 designed to ascertain the optimal architecture of the artificial neural network by repeatedly ascertaining a trajectory from the initial node to a terminal node based on the defined strategy, determining a reward for the ascertained trajectory, determining a cost function for the ascertained trajectory based on the ascertained reward for the trajectory and the flows associated with the edges along the trajectory, and respectively updating the flows associated with the edges along the trajectory, based on the cost function, wherein the steps of ascertaining a trajectory, of determining a reward, of determining a cost function, and of updating the flows are repeated until an ascertained trajectory fulfills a termination criterion for the architecture search, and wherein the trajectory that fulfills the termination criterion represents the optimal architecture.

The provision unit may in particular be a receiver designed to receive corresponding data. The mapping unit, the association unit, the definition unit and the ascertainment unit may furthermore respectively be realized, for example, based on code that is stored in a memory and can be executed by a processor.

In this case, the strategy for ascertaining an optimal architecture based on the directed graph again specifies, for each node of the directed graph, a probability of the trajectory to be ascertained passing through the corresponding node of the directed graph, wherein the probability is in each case proportional to the flow associated with an edge of the directed graph leading to the corresponding node, and wherein the ascertainment unit is designed to ascertain the trajectory by respectively selecting the edge with the highest probability.

According to the embodiments of FIG. 2, the ascertainment unit 25 is moreover again designed to determine the reward for the trajectory based on hardware conditions of at least one target component.

Furthermore, the system 20 may in particular be designed to perform a method described above for ascertaining an optimal architecture of an artificial neural network.

What is claimed is:

1. A method for ascertaining an optimal architecture of an artificial neural network, the optimal architecture of the artificial neural network being provided for controlling a controllable system, the method comprising the following steps:

providing a set of possible architectures of the artificial neural network;

mapping the set of possible architectures of the artificial neural network onto a directed graph, wherein nodes of the directed graph respectively symbolize a subset of one of the possible architectures, wherein an initial node symbolizes an input layer, wherein terminal nodes of the directed graph respectively symbolize a subset comprising an output layer, and wherein the edges of the directed graph respectively symbolize possible links between the subsets;

associating, for each edge of the directed graph, a flow with the corresponding edge;

defining a strategy for ascertaining an optimal architecture based on the directed graph;

ascertaining the optimal architecture of the artificial neural network by repeatedly:

ascertaining a trajectory from the initial node to a terminal node based on the defined strategy, determining a reward for the ascertained trajectory, determining a cost function for the ascertained trajectory based on the ascertained reward for the trajectory and the flows associated with the edges along the trajectory, and respectively updating the flows associated with the edges along the trajectory, based on the cost function; wherein the steps of ascertaining the trajectory, of determining the reward, of determining the cost function, and of updating the flows are repeated until an ascertained trajectory fulfills a termination criterion for an architecture search, and wherein the trajectory that fulfills the termination criterion represents the optimal architecture; and controlling the controllable system based on the ascertained optimal architecture of the artificial neural network.

2. The method according to claim 1, wherein the strategy for ascertaining the optimal architecture based on the directed graph specifies, for each node of the directed graph, a probability of the trajectory to be ascertained passing through the node of the directed graph, wherein the probability is in each case proportional to the flow associated with an edge of the directed graph leading to the node, and wherein the trajectory is ascertained by respectively selecting the edge with the highest probability and/or proportionally to the probability.

3. The method according to claim 1, wherein the reward for the ascertained trajectory is determined based on hardware conditions of at least one target component.

4. A method for training an artificial neural network, the method comprising the following steps:

providing training data for training the artificial neural network;

providing an optimal architecture for the artificial neural network, wherein the optimal architecture has been ascertained by:

providing a set of possible architectures of the artificial neural network, mapping the set of possible architectures of the artificial neural network onto a directed graph, wherein nodes of the directed graph respectively symbolize a subset of one of the possible architectures, wherein an initial node symbolizes an input layer, wherein terminal nodes of the directed graph respectively symbolize a subset comprising an output layer, and wherein the edges of the directed graph respectively symbolize possible links between the subsets, associating, for each edge of the directed graph, a flow with the corresponding edge, defining a strategy for ascertaining an optimal architecture based on the directed graph, and ascertaining the optimal architecture of the artificial neural network by repeatedly: ascertaining a trajectory from the initial node to a terminal node based on the defined strategy, determining a reward for the ascertained trajectory, determining a cost function for the ascertained trajectory based on the ascertained reward for the trajectory and the flows associated with the edges along the trajectory, and respectively updating the flows associated with the edges along the trajectory, based on the cost function; wherein the steps of ascertaining the trajectory, of determining the reward, of determining the cost function, and of updating the flows are repeated until an ascertained trajectory fulfills a termination criterion for an architecture search, and wherein the trajectory that fulfills the termination criterion represents the optimal architecture, and training the artificial neural network based on the training data and the optimal architecture.

5. The method according to claim 4, wherein the training data include sensor data.

6. A method for controlling a controllable system based on an artificial neural network, the method comprising the following steps:

providing an artificial neural network trained to control the controllable system, wherein the artificial neural network has been trained by:

providing training data for training the artificial neural network;

providing an optimal architecture for the artificial neural network, wherein the optimal architecture has been ascertained by:

providing a set of possible architectures of the artificial neural network, mapping the set of possible architectures of the artificial neural network onto a directed graph, wherein nodes of the directed graph respectively symbolize a subset of one of the possible architectures, wherein an initial node symbolizes an input layer, wherein terminal nodes of the directed graph respectively symbolize a subset comprising an output layer, and wherein the edges of the directed graph respectively symbolize possible links between the subsets, associating, for each edge of the directed graph, a flow with the corresponding edge, defining a strategy for ascertaining an optimal architecture based on the directed graph, and ascertaining the optimal architecture of the artificial neural network by repeatedly: ascertaining a trajectory from the initial node to a terminal node based on the defined strategy, determining a reward for the ascertained trajectory, determining a cost function for the ascertained trajectory based on the ascertained reward for the trajectory and the flows associated with the edges along the trajectory, and respectively updating the flows associated with the edges along the trajectory, based on the cost function; wherein the steps of ascertaining the trajectory, of determining the reward, of determining the cost function, and of updating the flows are repeated until an ascertained trajectory fulfills a termination criterion for an architecture search, and wherein the trajectory that fulfills the termination criterion represents the optimal architecture, and training the artificial neural network based on the training data and the optimal architecture;

controlling the controllable system based on the provided trained artificial neural network.

7. A system for ascertaining an optimal architecture of an artificial neural network, the optimal architecture of the artificial neural network being provided for controlling a controllable system, the system comprising at least one hardware processor configured to:

provide a set of possible architectures of the artificial neural network;

map the set of possible architectures of the artificial neural network onto a directed graph, wherein nodes of the directed graph respectively symbolize a subset of one of the possible architectures, wherein an initial node symbolizes an input layer, wherein terminal nodes of the directed graph respectively symbolize a subset including an output layer, and wherein edges of the directed graph respectively symbolize possible links between the subsets;

associate, for each edge of the directed graph, a respective flow with the corresponding edge;

define a strategy for ascertaining an optimal architecture based on the directed graph;

ascertain the optimal architecture of the artificial neural network by repeatedly performing the following steps: ascertaining a trajectory from the initial node to a terminal node based on the defined strategy, determining a reward for the ascertained trajectory, determining a cost function for the ascertained trajectory based on the ascertained reward for the trajectory and the flows associated with the edges along the trajectory, and respectively updating the flows associated with the edges along the trajectory, based on the cost function, wherein the steps of ascertaining a trajectory, of determining a reward, of determining a cost function, and of updating the flows are repeated until an ascertained trajectory fulfills a termination criterion for the architecture search, and wherein the trajectory that fulfills the termination criterion represents the optimal architecture; and control the controllable system based on the ascertained optimal architecture of the artificial neural network.

8. The system according to claim 7, wherein the strategy for ascertaining the optimal architecture based on the directed graph specifies, for each node of the directed graph, a probability of the trajectory to be ascertained passing through the node of the directed graph, wherein the probability is in each case proportional to the flow associated with an edge of the directed graph leading to the node, and wherein the ascertainment unit is configured to ascertain the trajectory by respectively selecting the edge with the highest probability.

9. The system according to claim 7, wherein the reward for the ascertained trajectory is determined based on hardware conditions of at least one target component.

10. A non-transitory computer-readable data carrier on which is stored program code of a computer program for ascertaining an optimal architecture of an artificial neural network, the optimal architecture of the artificial neural network being provided for controlling a controllable system, the program code, when executed by a computer, causing the computer to perform the following steps:

providing a set of possible architectures of the artificial neural network;

mapping the set of possible architectures of the artificial neural network onto a directed graph, wherein nodes of the directed graph respectively symbolize a subset of one of the possible architectures, wherein an initial node symbolizes an input layer, wherein terminal nodes of the directed graph respectively symbolize a subset comprising an output layer, and wherein the edges of the directed graph respectively symbolize possible links between the subsets;

associating, for each edge of the directed graph, a flow with the corresponding edge;

defining a strategy for ascertaining an optimal architecture based on the directed graph;

ascertaining the optimal architecture of the artificial neural network by repeatedly:

ascertaining a trajectory from the initial node to a terminal node based on the defined strategy, determining a reward for the ascertained trajectory, determining a cost function for the ascertained trajectory based on the ascertained reward for the trajectory and the flows associated with the edges along the trajectory, and respectively updating the flows associated with the edges along the trajectory, based on the cost function; wherein the steps of ascertaining the trajectory, of determining the reward, of determining the cost function, and of updating the flows are repeated until an ascertained trajectory fulfills a termination criterion for an architecture search, and wherein the trajectory that fulfills the termination criterion represents the optimal architecture; and controlling the controllable system based on the ascertained optimal architecture of the artificial neural network.

* * * * *